(12) United States Patent
Cummings

(10) Patent No.: US 6,724,833 B1
(45) Date of Patent: Apr. 20, 2004

(54) METHOD AND APPARATUS FOR COMMUNICATING INFORMATION

(75) Inventor: Mark R. Cummings, Atherton, CA (US)

(73) Assignee: Infineon Technologies AG, Munich (DE)

( * ) Notice: Subject to any disclaimer, the term of this patent is extended or adjusted under 35 U.S.C. 154(b) by 130 days.

(21) Appl. No.: 09/624,876

(22) Filed: Jul. 21, 2000

Related U.S. Application Data

(63) Continuation of application No. 09/223,501, filed on Dec. 30, 1998, now Pat. No. 6,175,589, which is a continuation of application No. 08/662,641, filed on Jun. 6, 1996, now Pat. No. 5,907,580.

(51) Int. Cl.[7] .......................... H04L 27/06; H04L 23/00
(52) U.S. Cl. ........................................ 375/316; 375/377
(58) Field of Search ................................ 375/316, 340, 375/377; 455/142, 524, 517

(56) References Cited

U.S. PATENT DOCUMENTS

| | | | |
|---|---|---|---|
| 4,398,265 A | * 8/1983 | Puhl et al. ................ 455/73 |
| 4,525,865 A | 6/1985 | Mears ...................... 455/186 |
| 4,637,022 A | 1/1987 | Burke et al. .............. 371/37 |
| 4,684,941 A | 8/1987 | Smith et al. .......... 340/825.52 |
| 4,912,756 A | * 3/1990 | Hop ........................ 379/60 |
| 5,081,707 A | 1/1992 | Schorman et al. ........ 455/186 |
| 5,237,570 A | * 8/1993 | Smolinske et al. ........ 455/84 |
| 5,243,593 A | * 9/1993 | Timbs ..................... 375/219 |
| 5,361,373 A | 11/1994 | Gilson .................... 395/800 |
| 5,404,547 A | * 4/1995 | Diamantstein et al. ..... 455/84 |
| 5,414,751 A | 5/1995 | Yamada ................... 379/58 |
| 5,444,869 A | * 8/1995 | Stricklin et al. .......... 455/88 |
| 5,497,373 A | 3/1996 | Hulen et al. .............. 370/79 |
| 5,524,276 A | 6/1996 | Littig et al. ............ 455/33.1 |
| 5,537,601 A | 7/1996 | Kimura et al. ........... 395/800 |
| 5,566,205 A | * 10/1996 | Delfine ................... 375/219 |
| 5,572,555 A | * 11/1996 | Soenen et al. ............ 375/364 |
| 5,574,775 A | 11/1996 | Miller, II et al. .......... 379/60 |
| 5,581,261 A | 12/1996 | Hickman et al. ......... 342/385 |
| 5,590,177 A | * 12/1996 | Vilmur et al. ............ 370/332 |
| 5,592,480 A | 1/1997 | Carney et al. ............ 370/347 |
| 5,655,003 A | 8/1997 | Erving et al. ............ 379/418 |
| 5,689,825 A | 11/1997 | Averbuch et al. .......... 455/89 |
| 5,768,268 A | 6/1998 | Kline et al. .............. 370/330 |
| 5,774,461 A | 6/1998 | Hyden et al. ............ 370/329 |
| 5,815,505 A | 9/1998 | Mills ...................... 370/522 |
| 5,857,109 A | 1/1999 | Taylor ..................... 395/800 |
| 5,862,480 A | 1/1999 | Wild et al. ............... 455/432 |
| 5,867,535 A | 2/1999 | Phillips et al. ........... 375/295 |
| 5,887,165 A | 3/1999 | Martel et al. ............ 395/653 |
| 5,887,254 A | 3/1999 | Halonen .................. 455/419 |
| 5,889,816 A | 3/1999 | Agrawal et al. .......... 375/220 |
| 5,907,580 A | 5/1999 | Cummings ............... 375/220 |
| 5,930,704 A | 7/1999 | Kay ....................... 455/419 |
| 6,132,306 A | * 10/2000 | Trompower ............. 455/11.1 |

FOREIGN PATENT DOCUMENTS

| | | |
|---|---|---|
| WO | WO 97/07466 | 2/1997 |
| WO | WO 97/38547 | 10/1997 |
| WO | WO 99/09721 | 2/1999 |
| WO | WO 99/13661 | 3/1999 |
| WO | WO 99/23762 | 5/1999 |
| WO | WO 99/50954 | 10/1999 |
| WO | WO 99/63728 | 12/1999 |

\* cited by examiner

Primary Examiner—Tesfaldet Bocure
(74) Attorney, Agent, or Firm—Darby & Darby

(57) ABSTRACT

A method and apparatus for communicating information between a remote location and a user. Information from the remote location or the user is received by the inventive apparatus and processed by configurable circuitry to a form that can be received and used by the intended recipient. The reconfigurable circuitry can be changed manually by a human user or remotely through the receipt of appropriate signals. Accordingly, the apparatus can be reconfigured to be able to receive information that is transmitted in different forms from those forms that are receivable before reconfiguration.

12 Claims, 1 Drawing Sheet

METHOD AND APPARATUS FOR COMMUNICATING INFORMATION

CROSS-REFERENCE TO RELATED APPLICATION

This application is a continuation of U.S. Pat. No. 6,175,589, issued Jan. 16, 2001, which is a continuation of Ser. No. 08/662,641 filed Jun. 6, 1996 U.S. Pat. No. 5,907,580, issued May 25, 1999.

TECHNICAL FIELD

The present invention relates to methods and apparatus for communicating information, and more particularly, to methods and apparatus for adapting to changing communications services.

BACKGROUND OF THE INVENTION

Personal communications is on the brink of an unprecedented expansion of its capabilities. With the advent of advanced personal communications services, such as cellular telephone and low earth orbit (LEO) satellite services, this expansion of capabilities benefits mobile users. Not only does the expansion of capabilities benefit voice communications, but it also benefits data communications, such as might be used with portable computers and other personal data communicators.

A major difficulty with the expansion of services is that a wide variety of different voice and data communications protocols have been proposed. It can be expected that this variety will increase, both world-wide and within a local area. For example, each communications service has its own technical, geographic and feature sets. Technical parameters include frequency(ies), modulation and protocol used, among others. Geographic parameters are dictated by the particular locale, such as footprint. Feature sets describe whether the service is voice, paging, data, or some combination of these.

As a consequence, a given communications device will become less useful as its user attempts to utilize it in areas that have incompatible services. For example, as people who rely on mobile communications move through a day, they can move in and out of different coverage areas and their communications needs will change constantly. Further, even within a local area, a given communications device will gradually become less useful as its built-in capabilities are rendered out-of-date by never services.

It is clearly undesirable for the individual to have to carry a different communication device for each communication service. Also, few individuals really want to know the details and peculiarities of each of the available communication service. Most individuals would such rather have seamless service that in simple, convenient and cost-effective.

Therefore, it is advantageous to have a single personal communications device that will reconfigure itself to be compatible with whatever communication service is desired or needed. This is difficult with today's conventional technology.

Conventional technology solutions use a combination of digital signal processing (DSP) integrated circuits and application-specific integrated circuits (ASICs). The use of a DSP in mobile applications is limited by the requirement to run on small batteries. This limits the DSP to relatively slow clock rates. If the DSP clock rate is increased, the battery life decreases rapidly. For example, when taking into account memory access, a DSP performing on the order of one hundred operations per sample on a megahertz range signal can require a clock rate in the gigahertz range. This can consume all the power in small portable batteries in unacceptably brief times.

There are presently approximately two dozen non-compatible wireless communications services, and the number is currently increasing rapidly. There are also about twelve wired communications services, of which approximately eight are widely used today. The number of services, particularly wireless ones, will continue to increase over the next several decades because technology is evolving rapidly.

Conventional technology approaches use a combination of analog processing and ASICs to process these high frequency signals. These approaches work well for single service portable devices but do not perform well with multiple services, especially in portable units. When applied to multiple services, the conventional approach results in the use of multiple ASIC chip sets and analog subsystems. It quite often results in the use of multiple DSPs as well. The result of using conventional technology approaches is a large, heavy, expensive portable unit having short battery life and a range of supported services which is stagnant. In fixed units the problems of battery life are diminished, but the problems with stagnant service growth are magnified.

SUMMARY OF THE INVENTION

According to one aspect, the invention is an apparatus for providing communication between a user and a remote system. The system includes a communication circuit, a configurable circuit, and a control circuit. The communication circuit communicates with the remote system through transmittal of electromagnetic energy. The configurable circuit is connected to the communication circuit in order to communicate with the communication circuit using a remote system communication signal. The configurable circuit is further connectable to the user in order to communicate with the user using a user communication signal. The configurable circuit is configurable in response to a configuration signal. The control circuit produces the configuration signal and is connected to the configurable circuit in order to control the configurable circuit.

According to a second aspect, the invention is also a method for providing communication between a user and a remote system. The method includes the steps of a) providing a communication circuit to communicate with the remote system through transmittal of electromagnetic energy, and b) providing a configurable circuit in order to communicate with the communication circuit using a remote system communication signal. The configurable circuit is further connectable to the user in order to communicate with the user using a user communication signal. Also, the configurable circuit is configurable in response to a configuration signal.

Further the method includes the steps of: c) connecting the configurable circuit to the communication circuit; d) providing a control circuit to produce the configuration signal; and e) connecting the control circuit to the configurable circuit in order to control the configurable circuit.

According to a further aspect, the invention is an apparatus for providing communication between a user and a remote system. The apparatus includes communication means for communicating with the remote system through transmittal of electromagnetic energy. The apparatus also includes configurable circuit means connected to the communication circuit for communicating with the communication circuit using a remote system communication signal.

The configurable circuit means is further connectable to the user for communicating with the user using a user communication signal. The configurable circuit means is configurable in response to a configuration signal. The apparatus further includes control circuit means for producing the configuration signal. The control circuit means is connected to the configurable circuit means in order to control the configurable circuit means.

DETAILED DESCRIPTION OF THE PREFERRED EMBODIMENT OF THE INVENTION

Figure 1:
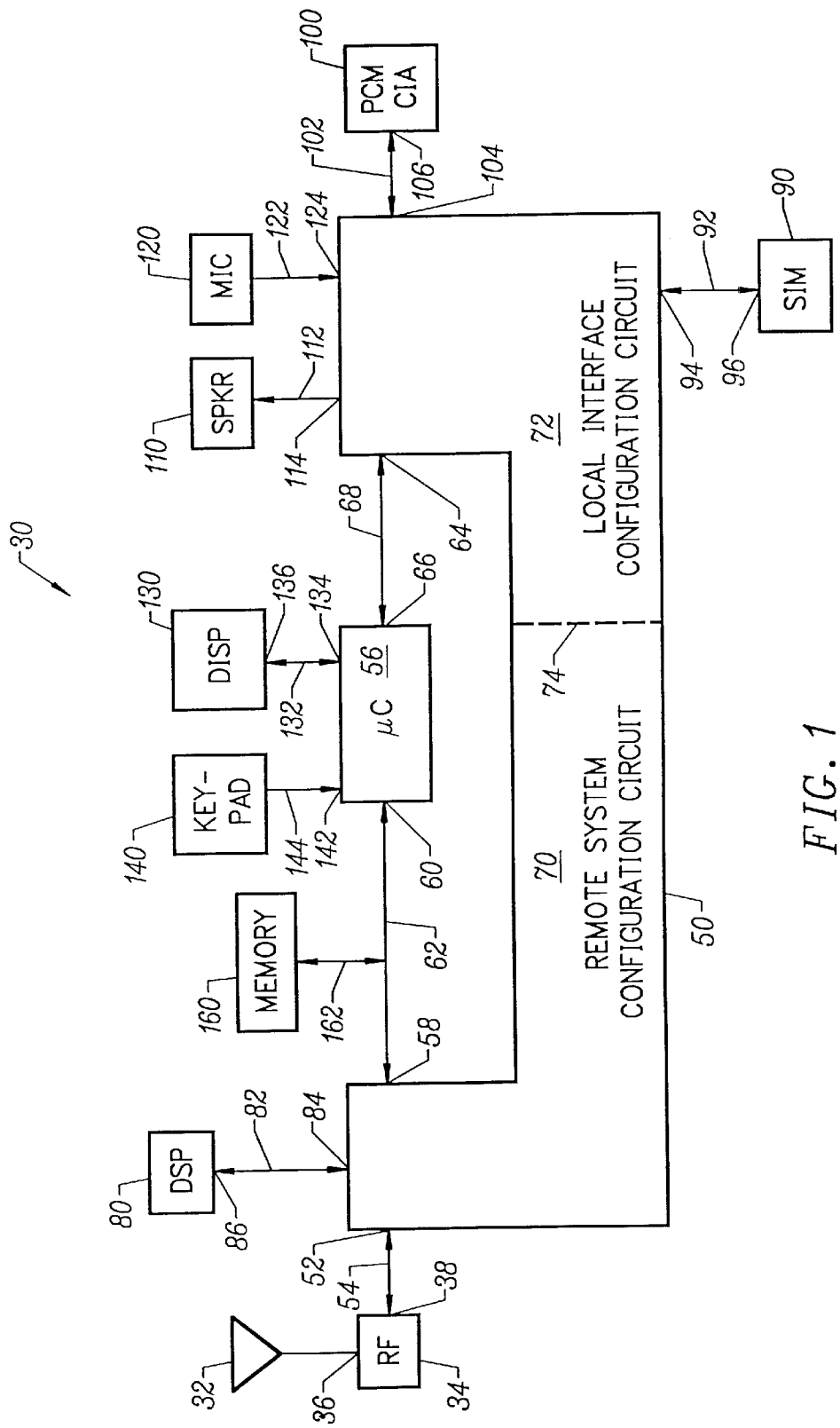
FIG. 1 is a schematic diagram of a preferred embodiment of the invention.

The approach to the problems described in the background of, the invention is to use reconfigurable logic to create highly scalar, deeply pipelined, reconfigurable digital processing systems. This system runs at the data rate of the signal being processed, rather than a multiple of the signal rate, thereby consuming less power, being able to process higher frequency signals, and achieving higher performance. It can be reconfigured in milliseconds, therefore allowing it to support a wide variety of services. When combined with inexpensive microcontrollers and DSPs, such systems can eliminate the need for multiple ASIC chip sets and analog subsystems in order to support multiple services. This results in devices that can deliver system units which are small, lightweight, inexpensive, have long battery life, support multiple services and can have new capabilities added in the field. These new capabilities extend to entirely new services.

The situation for some wired services (for example, broadband CDMA) is the same as for wireless services However, for ocher services the signal frequencies can be handled by conventional technology. Nonetheless, with the approach covered by this application, it is possible to support both multiple wired and wireless services at a much lower marginal cost than with conventional technology.

Both conventional technology and the technology covered by this invention rely on the same underlying chip fabrication processes, and improvements in the underlying processes will benefit both approaches equally. Therefore the relative advantage of the current inventive approach versus the conventional technology will continue over time.

FIG. 1 is a schematic diagram of a preferred embodiment of the invention. This structure can be implemented with a variety of physical processes including a printed circuit board, a multi-chip module and a single chip. The inventive communication circuit 30 has an antenna 32 which is connected to a radio frequency (RF) circuit 34 (also known as an RF "front-end" circuit) through an antenna port 36 of the RF circuit 34. The RF circuit 34 also has a bi-directional RF digital input port 38 chat can be used to reconfigure it in a manner described subsequently. The antenna 32 is used to communicate with a remote system (not shown) for the purpose of providing communications between the remote system and a user of the inventive communication circuit 30. In come cases, the user can be a human who is communicating audibly with the remote system. In other cases, the user can be an electronic device that is communicating electronically with the remote system.

The RF circuit 34 is adapted to receive a digital control signal through the RF digital input port 38. In response to the digital control signal, the RF circuit 34 can operate in a receive mode or in a transmit mode. In the receive mode the RF circuit 34 can respond to electromagnetic waves which cause a response in the antenna 32, the response being converted to electrical signals through transductive action of the antenna 32. The electrical signals are received through the antenna port 36 in the RF circuit 34. In the transmit mode the RF circuit 34 responds to the digital signals passed through the RF digital input port 38. The RF circuit 34 then transduces the information contained in the electrical signals and produces electromagnetic energy that is passed to the antenna 32 through tile antenna port 36.

The inventive communication circuit 30 also includes a configurable circuit 50 that communicates with the RF circuit 34 through a port 52 through a bi-directional line 54. The configurable circuit 50 can, for example, be made from one or more conventional field programmable gate arrays (FPGAs). The configurable circuit 50 is also connected to a microcontroller 56 in two places. A bi-directional port 58 of the configurable circuit 50 is connected to a bi-directional port 60 of the microcontroller 56 through a bi-directional line 62. Also, a bi-directional port 64 of the configurable circuit 50 is connected to a bi-directional port 66 of the microcontroller 56 through a bi-directional line 68.

The configurable circuit 50 can receive configuration signals from the microcontroller 56 through the bi-directional lines 62 and 68. The configuration signals cause the configurable circuit 50 to be partitioned into a remote system configurable circuit 70 and a local interface configurable circuit 72. The partition of the configurable circuit 50 into the remote system configurable circuit 70 and the local interface configurable circuit 72 is symbolized by the imaginary partition 74. The bi-directional port 56 of the configurable circuit 50 is always a part of the remote system configurable circuit 70 and the bi-directional port 64 of the configurable circuit 50 is always a part of the local interface configurable circuit 72, regardless of the way the configurable circuit 50 is partitioned. If desired, it can be advantageous to view the two partitions of the configurable circuit 50 co be separate from one another with a connection between the remote system configurable circuit 70 and the local interface configurable circuit 72.

The configurable circuit so is also connected to a digital signal processing (DSP) circuit 80 through a bi-directional line 82 which extends between a port 64 on the remote system configurable circuit 70 and a port 86 on the DSP 80. Although the DSP 80 is shown to be connected to the remote system configurable circuit 70 portion of the configurable circuit 50, it will be understood that the DSP circuit 80 could also be connected to the local interface configurable circuit 72.

The configurable circuit 50 is also connected to a security identification module (SIM) 90 (or other security or identification hardware required) through a bi-directional line 92 which extends between a port 94 on the local interface configurable circuit 72 and a port 96 on the SIM 90. The configurable circuit 50 performs the security and identification functions appropriate to the service or services being supported.

The local interface configurable circuit 72 is also connected to a local interface slot 100 (such as a PCMCIA slot) through a bi-directional line 102 which extends between a port 104 on the local interface configurable circuit 72 and a port 106 on the local interface slot 100.

The local interface configurable circuit 72 is also connected to a speaker 110 through a line 112 which extends between a port 114 on the local interface configurable circuit 72 and the speaker 110. Further, the local interface configurable circuit 72 is also connected to a microphone 120 through a line 122 which extends to a port 124 on the local interface configurable circuit 72.

The microcontroller 56, which may be a Hitachi HB-3002 microcontroller, is connected to a display 130, which may be a touch-input display device. The microcontroller 56 and the display 130 are connected through a bi-directional line 132 which extends between a port 134 on the microcontroller 56 and a port 136 on the display 130. A keypad 140 is also connected to a port 142 on the microcontroller 56 through a line 144.

Finally, a memory 160 is connected through a bi-directional line 162 to the port 58 on the remote system configurable circuit 70 and the port 60 on the microcontroller 56.

In use, the inventive communication circuit 30 is responsive to signals that program the microcontroller 56. The programming signals can be loaded into a program memory on the microcontroller 56 from the memory 160 through the lines 162 and 62 into the port 60. The microcontroller 56 is also responsive to commands and data entered through the keypad 140 and the line 144 into the port 142. The microcontroller 56 can also produce display signals, in response to inputs and its programming, to be displayed on the display 130 after passage through the line 132 from the port 134 to the port 136.

The microcontroller 56 is programmed to respond to various input signals by changing the configuration of the configurable circuit 50. For example, a portion of the configurable circuit 50 can be configured to respond in predetermined ways to signals received by the remote system configurable circuit 70, for example, by passing audible signals to the speaker 110. Simultaneously, a portion of the configurable circuit 50 can be configured to respond in predetermined ways to signals received by the local interface configurable circuit 72, for example, by causing the antenna 32 to transmit electromagnetic signals to the remote system. If desired the configurable circuit so can be configured to communicate with the DSP 80 for special purpose digital signal processing. Further, the configurable circuit 50 can be configured to communicate with the SIM 90 to provide additional security to communications through the inventive communication circuit 30.

The configuration of the configurable circuit 50 can easily be changed over time, as conditions change. For example, the inventive communication circuit 30 can pass from one geographic region to another. This may require the use of an additional communication service based on new modulation/demodulation techniques, protocols and possibly new transmit and receive frequencies. Upon receipt of appropriate reconfiguration signals, the microcontroller 56 will reconfigure the configurable circuit so, load and/or activate programs in the DSP 130 and microcontroller 56 and, if necessary, reconfigure the RF circuit 34 through ways known to those skilled in the art. The microcontroller 56 may get the configuration and associated information (called TimeWare™) associated programs from memory or from the local interface slot 100 or from a remote system through the RF circuit 34.

While the foregoing is a detailed description of the preferred embodiment of the invention, there are many alternative embodiments of the invention that would occur to those skilled in the art and which are within the scope of the present invention. Included among those embodiments are those disclosed in United States patent applications filed concurrently with the parent of this present application, under Express Mail certificates EG952820632US and EG952820615US, and having respective Ser. Nos. 60/022,089 and 60/018,103. Also included among those embodiments are those disclosed in United States patent applications filed concurrently with this present PCT application, under Express Mail certificates EH447699524US and EH447699541US. Accordingly, the present invention is to be determined by the following claims.

What is claimed is:

1. A wireless communications device, comprising:
    a communication circuit to sequentially receive a set of signals associated with non-compatible wireless communications services;
    a control circuit including a microcontroller to sequentially generate a set of configuration signals corresponding to said non-compatible wireless communications services; and
    a reconfigurable logic circuit connected to said communication circuit and said control circuit, said reconfigurable logic circuit processing said configuration signals to sequentially facilitate communications in accordance with said set of non-compatible wireless communications services.

2. The wireless communications device of claim 1 wherein said reconfigurable logic circuit is reconfigurable to support different modulation/demodulation techniques, protocols, and communications frequencies associated with said non-compatible wireless communications services.

3. The wireless communications device of claim 1 wherein said reconfigurable logic circuit is configured to perform a security function associated with a selected wireless communications service of said non-compatible wireless communications services.

4. The wireless communications device of claim 1 wherein said reconfigurable logic circuit is configured to perform an identification function of a selected wireless communications service of said non-compatible wireless communications services.

5. The wireless communications device of claim 1 wherein the microcontroller is programmed to respond to input signals by changing a configuration of the reconfigurable logic circuit.

6. The wireless communications device of claim 5 wherein configuration information is supplied to the microcontroller from a source external to the communications device.

7. A method of executing wireless communications on a mobile wireless communications device, said method comprising the steps of:
    sequentially receiving a set of signals associated with non-compatible wireless communications services;
    sequentially generating in a microcontroller a set of configuration signals corresponding to said non-compatible wireless communications services; and
    sequentially reconfiguring a reconfigurable logic circuit in accordance with said configuration signals to facilitate communications in accordance with said set of non compatible wireless communications services.

8. The method of claim 7 wherein said sequentially reconfiguring includes sequentially reconfiguring said reconfigurable logic circuit to support different modulation/demodulation techniques, protocols, and communications frequencies associated with said non-compatible wireless communications services.

9. The method of claim 7 wherein said sequentially reconfiguring includes reconfiguring said reconfigurable logic circuit to perform a security function associated with a selected wireless communications service of said non-compatible wireless communications services.

10. The method of claim 7 wherein said sequentially reconfiguring includes reconfiguring said reconfigurable logic circuit to perform an identification function of a selected wireless communications service of said non-compatible wireless communications services.

11. The method of claim 7 further comprising the step of providing input signals to the microcontroller to cause it to reconfigure the reconfigurable logic circuit.

12. The method of claim 11 wherein configuration information is supplied to the microcontroller from a source external to the communications device.

* * * * *

UNITED STATES PATENT AND TRADEMARK OFFICE
CERTIFICATE OF CORRECTION

PATENT NO. : 6,724,833 B1
DATED : April 20, 2004
INVENTOR(S) : Mark R. Cummings

It is certified that error appears in the above-identified patent and that said Letters Patent is hereby corrected as shown below:

Title page,
Item [63], Related U.S. Application Data, delete "Continuation of application No. 09/223,502, filed on Dec. 30, 1998, now Pat. No. 6,175,589, which is a continuation of application No. 08/662,641, filed on Jun. 6, 1996, now Pat. No. 5,907,580." and substitute -- Continuation of application No. 09/223,501, filed on Dec. 30, 1998, now Pat. No. 6,175,589, which is a continuation of application No. 08/662,641, filed on Jun. 10, 1996, now Pat. No. 5,907,580. --

Signed and Sealed this

Tenth Day of August, 2004

JON W. DUDAS
*Acting Director of the United States Patent and Trademark Office*